United States Patent
Miyagawa et al.

(10) Patent No.: US 7,845,167 B2
(45) Date of Patent: Dec. 7, 2010

(54) EXHAUST HEAT RECOVERY SYSTEM

(75) Inventors: Masashi Miyagawa, Ichinomiya (JP); Yasutoshi Yamanaka, Kariya (JP); Takahisa Suzuki, Nagoya (JP); Koichi Ban, Tokai (JP)

(73) Assignee: Denso Corporation, Kariya (JP)

( * ) Notice: Subject to any disclaimer, the term of this patent is extended or adjusted under 35 U.S.C. 154(b) by 546 days.

(21) Appl. No.: 12/012,971

(22) Filed: Feb. 6, 2008

(65) Prior Publication Data
US 2008/0190101 A1 Aug. 14, 2008

(30) Foreign Application Priority Data
Feb. 8, 2007 (JP) .............................. 2007-029569

(51) Int. Cl.
*F01N 3/02* (2006.01)
(52) U.S. Cl. .............................. 60/320; 60/282; 60/298; 60/309; 60/616; 60/618; 123/41.13; 123/41.2; 123/41.29; 165/51; 165/52
(58) Field of Classification Search ................... 60/280, 60/282, 298, 309, 320, 321, 514, 616, 618; 123/41.1, 41.13, 41.2, 41.21, 41.29, 196 AB; 165/51, 52, 66
See application file for complete search history.

(56) References Cited

U.S. PATENT DOCUMENTS

| | | | |
|---|---|---|---|
| 2,287,172 A * | 6/1942 | Harrison et al. | 62/106 |
| 3,748,830 A * | 7/1973 | Ross et al. | 95/195 |
| 4,974,667 A | 12/1990 | Sun et al. | |
| 5,343,699 A * | 9/1994 | McAlister | 60/273 |
| 7,055,337 B2 * | 6/2006 | Horn et al. | 62/199 |
| 7,246,487 B2 * | 7/2007 | Hara | 60/298 |
| 7,302,795 B2 * | 12/2007 | Vetrovec | 60/309 |

FOREIGN PATENT DOCUMENTS

| | | |
|---|---|---|
| JP | 2-71015 | 5/1990 |
| JP | 3-13208 | 2/1991 |
| JP | 03-128719 | 5/1991 |

OTHER PUBLICATIONS

Office action dated Jul. 14, 2009 in corresponding Japanese application No. 2007-029569.
Office action dated Nov. 18, 2008 in Japanese application No. 2007-029569.
Office action dated Apr. 24, 2009 in Chinese application No. 2008 10008897.7.

* cited by examiner

*Primary Examiner*—Binh Q. Tran
(74) *Attorney, Agent, or Firm*—Harness, Dickey & Pierce, PLC

(57) ABSTRACT

In an exhaust heat recovery system for an internal combustion engine, a heat pipe includes an evaporation portion in which a working fluid is heated and evaporated by heat exchange with exhaust heat from the internal combustion engine, a plurality of condensing portions in which the working fluid from the evaporation portion is cooled and condensed by heat exchange with respective subjects to be heated, and connection piping through which the condensing portions are connected to the evaporation portion in parallel with respect to the evaporation portion so as to form a closed circuit. Furthermore, a switching portion is located to switch a flow of the working fluid from the evaporation portion to any one between the condensing portions.

7 Claims, 2 Drawing Sheets

EXHAUST HEAT RECOVERY SYSTEM

CROSS REFERENCE TO RELATED APPLICATION

This application is based on Japanese Patent Application No. 2007-029569 filed on Feb. 8, 2007, the contents of which are incorporated herein by reference in its entirety.

BACKGROUND OF THE INVENTION

1. Field of the Invention

The present invention relates to an exhaust heat recovery system for recovering exhaust heat discharged from an internal combustion engine.

2. Description of the Related Art

In an exhaust heat recovery system described in JP-A-3-128719, an auxiliary heating is performed for an air conditioner by using exhaust heat from an engine. The exhaust heat recovery system is provided with a heat pipe that includes an evaporation portion (heat receiving portion) at one end, and a condensing portion (heat radiating portion) at the other end. The evaporation portion is located in an exhaust gas passage of the engine, and the condensing portion is located adjacent a heater core in an air conditioning case of the air conditioner. The heater core heats air passing therethrough by using engine coolant (hot water) in a water circuit as a heating source.

Generally, the temperature of exhaust heat is rapidly increased as compared with the temperature of engine coolant at an initial time immediately after an engine start. In the exhaust heat recovery system, the heating operation of the air conditioner is performed by using the exhaust gas, so as to improve a rapid heating performance in the air conditioner. However, in the above exhaust heat recovery system, the heat recovered in the exhaust heat of the engine is only used for heating air in the air conditioner in the winter, and thereby it is difficult to effectively use the exhaust heat from the engine.

SUMMARY OF THE INVENTION

In view of the foregoing problems, it is an object of the present invention to effectively use heat recovered from exhaust gas of an internal combustion engine.

It is another object of the present invention to provide an exhaust heat recovery system in which a plurality of condensing portions are connected to an evaporation portion in parallel with respect to the evaporation portion.

According to an aspect of the present invention, an exhaust heat recovery system for an internal combustion engine includes a heat pipe in which a working fluid circulates, and a switching portion for switching a flow of the working fluid. The heat pipe includes an evaporation portion in which the working fluid is heated and evaporated by heat exchange with exhaust heat from the internal combustion engine, a plurality of condensing portions in which the working fluid from the evaporation portion is cooled and condensed by heat exchange with respective subjects to be heated, and connection piping through which the condensing portions are connected to the evaporation portion in parallel with respect to the evaporation portion so as to form a closed circuit. Furthermore, the switching portion is located to switch a flow of the working fluid from the evaporation portion to any one between the condensing portions. Accordingly, the heat recovered from the exhaust heat can be effectively used for any one of the condensing portions. For example, the condensing portions may have respective uses, which are different from each other.

The plurality of condensing portions may include at least a first condensing portion that is located to heat the internal combustion engine at an initial start time of the engine, and a second condensing portion that is located to heat a subject different from the internal combustion engine. In this case, the first condensing portion and the second condensing portion are connected to the evaporation portion in parallel with respect to the evaporation portion, and the switching valve is located to switch the flow of the working fluid from the evaporation portion to flow to any one between the first and second condensing portions.

Furthermore, the piping may include a vapor pipe connected to the evaporation portion, first and second vapor branch pipes branched from the vapor pipe at a branch portion and connected to the first and second condensing portions respectively. In this case, the switching valve may be located at the branch portion. The piping may further include a first and second liquid pipes connected to the first and second condensing portions, respectively. In this case, the first and second liquid pipes are joined to a join pipe at a joint portion, and the join pipe is connected to the evaporation portion.

As an example, the evaporation portion may be located in an exhaust pipe of the engine to absorb heat from exhaust gas from the engine, the first condensing portion may be located in an engine coolant circuit to heat the engine coolant, and the second condensing portion may be located in an air conditioner to heat air in the air conditioner. Furthermore, a control portion may be provided for controlling the operation of the switching valve based a temperature relative to a temperature of exhaust gas of the engine and an environmental condition.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

An embodiment of the present invention will be now described with reference to FIGS. 1 to 2C.

Figure 1:
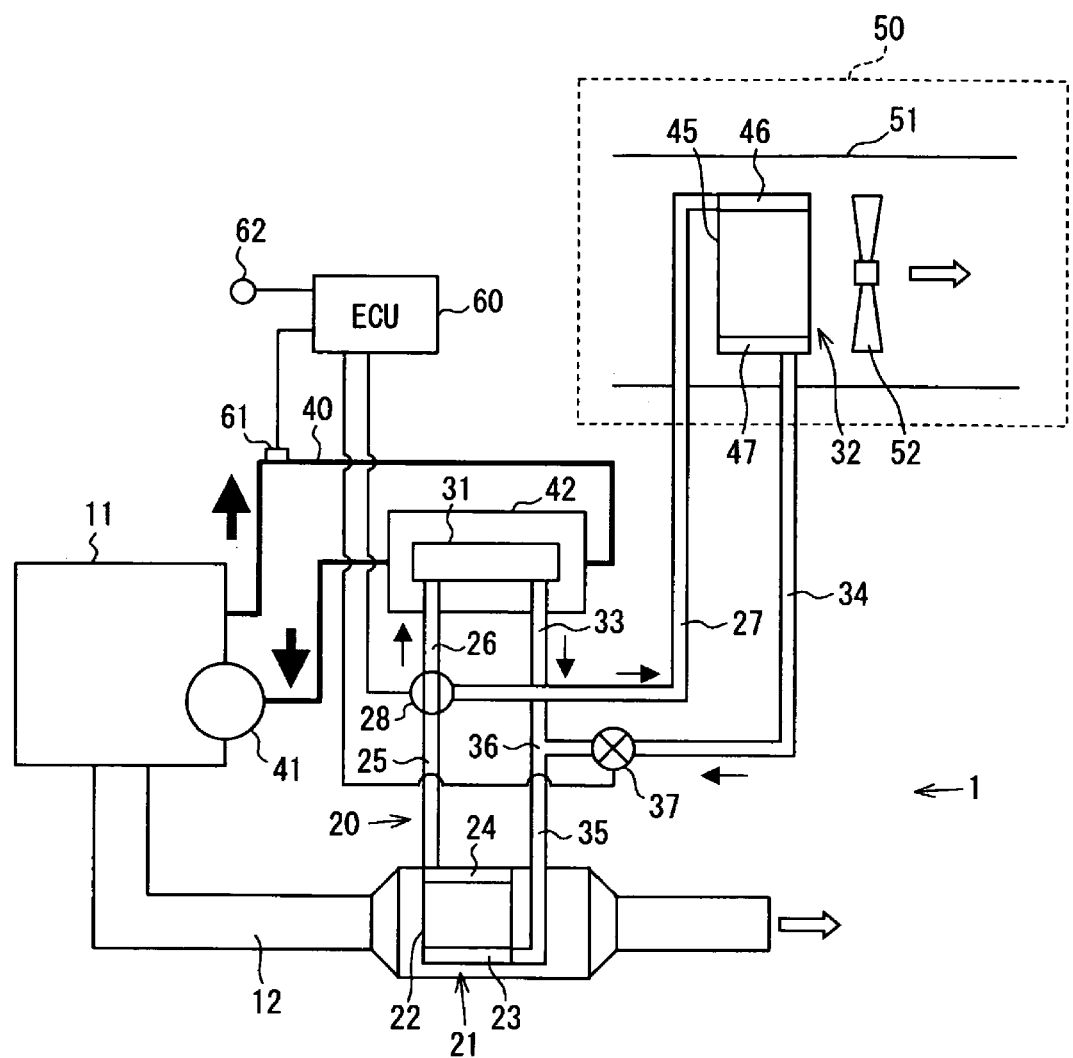
FIG. 1 is a schematic diagram showing an exhaust gas recovery system according to an embodiment of the present invention.

As shown in FIG. 1, an exhaust heat recovery system 1 includes an engine (internal combustion engine) 11 used as a driving source for a vehicle running, an exhaust gas pipe 12 trough which exhaust gas discharged from the engine 11 flows.

The exhaust heat recovery system 1 is provided with a heat pipe 20 for recovering exhaust heat from the engine 11. For example, the heat pipe 20 is a loop-type heat pipe in which first and second condensing portions 31, 32 are connected to the evaporation portion 21 in parallel with respect to an evaporation portion 21. The first and second condensing portions 31, 32 are located above the evaporation portion 21 and are coupled to the evaporation portion 21 so as to form a closed circuit in which a working fluid circulates.

The heat pipe 20 has an inlet port (not shown) from which the working fluid is introduced. The working fluid is introduced from the inlet port to be held in the heat pipe 20, and the inlet port is sealed after the working fluid within the heat pipe 20 is decompressed to about 0.01 atm, for example. Water may be used as the working fluid, as an example. The boiling point of water at 1 atm is 100° C. However, when the water is decompressed to about 0.01 atm, the boiling point of water in the heat pipe 20 becomes in a range of 5-10° C. As the working fluid, the other fluid such as alcohol, fluorocarbon and flon may be used.

The evaporation portion 21 includes a core portion 22, and upper and lower communication portions 23, 24 (e.g., upper and lower tanks). In the core portion 22, the working fluid sealed in the heat pipe 20 is heated by performing heat exchange with the exhaust heat in the exhaust gas pipe 12, and is evaporated. For example, the core portion 22 includes a plurality of flat tubes extending in a vertical direction (up-down direction), and fins thermally connected to the flat tubes between adjacent flat tubes. That is, the flat tubes and the fins are alternately arranged in an arrangement direction to form the core portion 22. The lower communication portion 23 are connected to a lower end portion of the core portion 22 to communicate with the lower ends of the flat tubes, and the upper communication portion 24 are connected to an upper end portion of the core portion 22 to communicate with the upper ends of the flat tubes.

The upper communication portion 24 of the evaporation portion 21 is connected to one end of a vapor pipe 25 through which the working fluid evaporated in the evaporation portion 21 flows upwardly. The other end of the vapor pipe 25 is connected to respective ends of branched vapor pipes 26, 27 via a switching valve (passage switching portion) 28.

The exhaust heat recovery system 1 is provided with an exhaust heat recovery circuit 40 (coolant circuit) in which engine coolant (e.g., water) for cooling the engine 11 is circulated by a water pump 41. The water pump 41 may be driven by the engine 11 as shown in FIG. 1, or may be driven by a power source such as an electrical power other than the engine 11. In this embodiment, the exhaust heat recovery circuit 40 can be provided independently from a radiator circuit (not shown) or a heater circuit (not shown), in which engine coolant circulates. The exhaust heat recovery circuit 40 is provided with an elongated water tank 42.

The first condensing portion 31 of the heat pipe 20 is located in the water tank 42 such that the working fluid evaporated in the evaporation portion 21 is heat exchanged with the engine coolant in the water tank 42. The first condensing portion 31 is a stack type heat exchanger in which plural tubes are stacked. One end side of the first condensing portion 31 is connected to the other end of the vapor pipe 26, the other end side of the first condensing portion 31 is connected to one end of a return pipe 33. The first condensing portion 31 is located to heat a subject to be heated (e.g., engine coolant in this embodiment) by performing a heat exchange with the working fluid having been evaporated in the evaporation portion 21. The heated engine coolant is used for performing a heating of the engine 11.

The exhaust heat recovery system 1 can be used for an air conditioner 50. The air conditioner 50 includes an air conditioning case 51 for forming an air passage through which air flows into a vehicle compartment. A fan 52 is located in the air conditioning case 51 to generate an air flow toward the vehicle compartment. The second condensing portion 32 of the heat pipe 20 is located in the air conditioning case 51 together with a heater core or/and an evaporator provided therein. Air passing through the second condensing portion 32 is heat exchanged with the working fluid evaporated in the evaporation portion 21, so that the working fluid is cooled and condensed and air in the air conditioning case 51 is heated. The second condensing portion 32 can be used for performing an initial heating operation for heating air in the air conditioning case 51 from a time immediately after a start of the engine 11 to a time where the temperature of engine coolant flowing into the heater core of the air conditioner 50 is increased to a predetermined temperature.

The second condensing portion 32 includes a core portion 45 for performing a heat exchange between the working fluid and air flowing in the air conditioning case 51. For example, the core portion 45 includes a plurality of flat tubes extending in a vertical direction (up-down direction), and fins thermally connected to the flat tubes between adjacent flat tubes. That is, the flat tubes and the fins are alternately arranged in an arrangement direction. An upper communication portion 46 (e.g., upper tank) is connected to an upper end portion of the core portion 45 to communicate with the upper ends of the flat tubes of the core portion 45. The upper communication portion 46 is connected to the other end of the vapor pipe 27. A lower communication portion 47 (e.g., lower tank) is connected to a lower end portion of the core portion 45 to communicate with the lower ends of the flat tubes of the core portion 45. The lower communication portion 47 is connected to one end of a return pipe 34. An opening and closing valve 37 for shutting off a return flow of the working fluid is located in the return pipe 34. The return pipe 33 and the return pipe 34 are joined at a join portion 36, the join portion 36 is connected to the return pipe 35. The return pipe 35 is connected to the lower communication portion 23 of the evaporation portion 21.

Figure 2A:
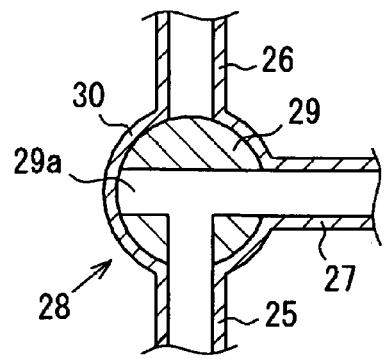
FIGS. 2A, 2B and 2C are schematic sectional views showing a switching valve at different switch positions according to the embodiment.
Figure 2B:
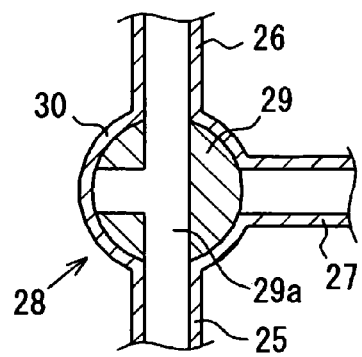
Figure 2C:
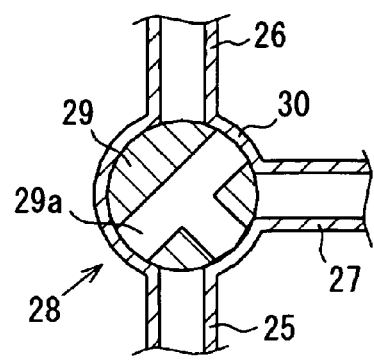

FIGS. 2A to 2C are schematic sectional views showing the structure of the switching valve 28 at different operation states (different switching states). As shown in FIGS. 2A to 2C, the switching valve 28 includes a valve body 30, and a ball-like valve portion 29. The three vapor pipes 25, 26 and 27 are connected to the valve body 30 at different directions on the same surface that is parallel to the paper of FIGS. 2A to 2C. The vapor pipe 25 is connected to the valve body 30 from a lower side in FIGS. 2A to 2C, the vapor pipe 26 is connected to the valve body 30 from the upper side of FIGS. 2A to 2C, and the vapor pipe 27 is connected to the valve body 30 from the right side in FIGS. 2A to 2C.

The valve portion 29 has therein a fluid passage 29a formed in a T shape in a cross section that is parallel to the paper of FIGS. 2A to 2C. The valve portion 29 is rotatable by an actuator having a shaft extending a direction perpendicular to the cross section, and the rotation position of the valve portion 29 is controlled by a control portion 60 (ECU). The switching valve 28 can be switched to cause the working fluid evaporated in the evaporation portion 21 to flow to any one between the first and second condensing portions 31, 32.

FIG. 2A shows a state in which the vapor pipe 25 and the vapor pipe 27 communicate with each other so that the working fluid evaporated in the evaporation portion 21 flows toward the second condensing portion 32 via the vapor pipe 27. FIG. 2B shows a state in which the vapor pipe 25 and the vapor pipe 26 communicate with each other so that the working fluid evaporated in the evaporation portion 21 flows toward the first condensing portion 31 via the vapor pipe 26. Furthermore, FIG. 2C shows a state in which the vapor pipe 25 does not communicate with any one of the vapor pipes 26, 27 so that the working fluid evaporated in the evaporation portion 21 does not flow toward the first condensing portion 31 and the second condensing portion 32. As shown in FIGS. 2A, 2B and 2C, the switching valve 28 can be switched from the state of FIG. 2C to one of the states of FIGS. 2A and 2B, so that the working fluid evaporated in the evaporation portion 21 can flow into any one of the first and second condensing portions 31, 32. Furthermore, the switching valve 28 can be operated to shut the fluid passage 29a by using the valve body 30 so that the vapor pipe 25 does not communicate with any one of the vapor pipes 26 and 27.

The exhaust heat recovery system 1 is provided with an outside air temperature sensor 62 for detecting an outside air temperature (environmental condition) and for outputting an outside air temperature signal, and a coolant temperature sensor 61 for detecting a temperature of engine coolant and for outputting a coolant temperature signal.

The control portion 60 (ECU) includes a CPU, a ROM, a RAM and the like which are generally known. The control portion 60 performs a passage switching control of the switching valve 28 and opening/closing control of the opening and closing valve 37.

Next, operation of the exhaust heat recovery system 1 according to the embodiment will be described. When the engine 11 operates, the water pump 41 is operated in connection with the operation of the engine 11, so that the engine coolant is circulated to the exhaust heat recovery circuit 40 or/and the radiator circuit and the heater circuit. The exhaust gas from the engine 11 flows into the exhaust gas pipe 12, and is discharged toward the atmosphere after passing through the evaporation portion 21 of the heat pipe 20. Thus, the working fluid is heat exchanged in the evaporation portion 21 with exhaust gas that is relatively high from the initial start time of the engine 11, and is evaporated. The evaporated working fluid flows from the evaporation portion 21 upwardly to the vapor pipe 25.

The control portion 60 determines whether or not it is necessary to perform an initial heating operation for heating air in the air conditioner 50 based on a coolant temperature or/and a heating request, and determines whether or not it is necessary to perform a heating of the engine 11 based on the coolant temperature. In the embodiment, the initial heating operation for heating air in the air conditioner 50 by using the second condensing portion 32 may be set to be performed preferentially than the heating of the engine 11.

For example, when a heating operation is required from the air conditioner 50 and the coolant temperature is lower than a first threshold value Tth1, the control portion 60 determines that the initial heating operation for heating air by using the second condensing portion 32 in the air conditioner 50 is necessary. In this case, the control portion 60 causes the switching valve 28 to be switched to the state shown in FIG. 2A.

When the switching valve 28 is switched to the state shown in FIG. 2A, the working fluid evaporated in the evaporation portion 21 flows to the second condensing portion 32 via the vapor pipes 25, 27. The working fluid flowing into the second condensing portion 32 is cooled and condensed by heat exchange with air flowing in the air conditioning case 51. With this, air passing through the second condensing portion 32 is heated by the heat exchange with the working fluid in the second condensing portion 32, and the heated air is blown by the blower 52 into the vehicle compartment. The working fluid cooled and condensed in the second condensing portion 32 flows and drops in the return pipes 34, 35, and returns to the evaporation portion 21.

When the coolant temperature is increased to be higher than the first threshold value Tth1, the control portion 60 determines that it is unnecessary to perform the initial heating operating in the air conditioner 50 by using the second condensing portion 32. In this case, because the heating operation in the air conditioner 50 can be sufficiently performed by the heater core in the air conditioner 50 using the engine coolant as a heating source, the control portion 60 causes the switching valve 28 to be switched to the state of FIG. 2B.

When the switching valve 28 is switched to the state of FIG. 2B, the working fluid evaporated in the evaporation portion 21 flows into the first condensing portion 31 via the vapor pipes 25, 26. The working fluid flowing into the first condensing portion 31 is cooled and condensed in the first condensing portion 31 by performing heat exchange with the engine coolant within the water tank 42. At the same time, the engine coolant in the water tank 42 is heated by heat exchange with the working fluid of the first condensing portion 31, thereby facilitating the heating of the engine 11. The working fluid condensed in the first condensing portion 31 flows and drops in the return pipes 33, 35, and returns to the evaporation portion 21.

Furthermore, when the engine coolant temperature is increased to a second threshold value Tth2 that is higher than the first threshold value Tth1, the control portion 60 finishes the heating of the engine 11. At this time, the control portion 60 causes the switching valve 28 to be switched to the state of FIG. 2A, and causes the opening and closing valve 37 to be in a closed state. In this case, although the working fluid evaporated in the evaporation portion 21 is cooled and condensed in the second condensing portion 32, the return pipe 34 is shut off by the opening and closing valve 37. Therefore, the condensed working fluid does not returns to the evaporation portion 21. Thereafter, when the control portion 6 determines that the temperature of exhaust gas in the exhaust pipe 12 becomes lower than a predetermined temperature due to a stop of the engine 11 or a decrease of the engine coolant etc, the control portion 60 causes the opening and closing valve 37 to be in the open state. With this, the working fluid returns to the evaporation portion 21.

When it is necessary to perform the initial heating operation in the air conditioner, the initial heating operation is performed by using the second condensing portion 32 in the exhaust heat recovery system, so as to increase the rapid heating performance of the vehicle compartment in the air conditioner 50. Furthermore, when it is determined that the initial heating operation is unnecessary in the air conditioner 50 in the season except for the winter, the heating of the engine 11 is performed by using the first condensing portion 31, so as to increase the rapid heating performance in the engine 11.

As described above, in the embodiment, the exhaust heat recovery system is provided with the first and second condensing portions 31, 32 having different usages or functions with respect to the single evaporation portion 21, and the flow of the working fluid evaporated in the evaporation portion 21 is switched by the switching valve 28 to flow to any selected one between the first and second condensing portions 31 and 32. Therefore, the heat recovered from the exhaust gas can be used in a wider range, thereby effectively using the exhaust heat from the engine 1.

Other Embodiments

Although the present invention has been fully described in connection with the preferred embodiment thereof with reference to the accompanying drawings, it is to be noted that various changes and modifications will become apparent to those skilled in the art.

For example, in the above-described embodiment, the second condensing portion 32 is used for the initial heating operation for heating air in the air conditioner 50 until the coolant temperature is increased to the first threshold valve. However, the second condensing portion 32 may be used as an auxiliary heater for heating air in the air conditioning case 51 after the initial heating operation in the air conditioner while the heater core in the air conditioning case 51 is used as a main heater.

In the above-described embodiment, the two condensing portions 31 and 32 having different functions or/and usages are arranged with respect to the one evaporation portion 21. However, three or more condensing portions 31 having different functions or/and usages may be arranged with respect to the one evaporation portion 21. In this case, the recovery heat in the exhaust heat recovery system can be more effectively used. For example, the exhaust heat recovery system includes a plurality of condensing portions more than two in which the working fluid from the evaporation portion 21 is cooled and condensed by heat exchange with respective subjects to be heated. Even in this case, the condensing portions are connected to the evaporation portion 21 in parallel with respect to the evaporation portion 21 by using connection piping (25, 26, 27, 33, 34, 35) so as to form a closed circuit, and a switching portion can be located to switch a flow of the working fluid from the evaporation portion 21 to any one between the condensing portions.

In the above-described embodiment, the condensing portions 31, 32 are used, respectively, for the heating of the engine 11 and for the air heating operation of the air conditioner 50. However, the condensing portions 31, 32 may be used for storing hot water in a heat accumulator of the vehicle, for increasing a temperature of intake air of the engine 11, for increasing a temperature of a battery liquid, or for the like.

In the above-described embodiment, the pipes 25, 26, 27, 33, 34, 35 are extend in the vertical direction (up-down direction). However, the pipes 25, 26, 27, 33, 34, 35 may extend in a direction tilted from the vertical direction or may extent on other direction if the evaporated working fluid can flow from the evaporation portion 21 to the condensing portions 31, 33 and the condensed working fluid can flow from the condensing portions 31, 32 to the evaporation portion 21. Furthermore, the evaporation portion 21 and the second condensing portion 32 may be arranged to be tilted with respect to the vertical direction, and may be arranged in the other state.

Such changes and modifications are to be understood as being within the scope of the present invention as defined by the appended claims.

What is claimed is:

1. An exhaust heat recovery system for an internal combustion engine, comprising:
   a heat pipe in which a working fluid circulates, the heat pipe including
      an evaporation portion in which the working fluid is heated and evaporated by heat exchange with exhaust heat from the internal combustion engine,
      a plurality of condensing portions in which the working fluid from the evaporation portion is cooled and condensed by heat exchange with respective subjects to be heated, and
      connection piping through which the condensing portions are connected to the evaporation portion in parallel with respect to the evaporation portion so as to form a closed circuit; and
   a switching portion located to switch a flow of the working fluid from the evaporation portion to any one between the condensing portions.

2. The exhaust heat recovery system according to claim 1, wherein the condensing portions have respective uses, which are different from each other.

3. The exhaust heat recovery system according to claim 1, wherein
   the plurality of condensing portions includes at least a first condensing portion that is located to heat the internal combustion engine at an initial start time of the engine, and a second condensing portion that is located to heat a subject different from the internal combustion engine,
   the first condensing portion and the second condensing portion are connected to the evaporation portion in parallel with respect to the evaporation portion, and
   the switching valve is located to switch the flow of the working fluid from the evaporation portion to flow to any one between the first and second condensing portions.

4. The exhaust heat recovery system according to claim 3, wherein
   the piping includes a vapor pipe connected to the evaporation portion, first and second vapor branch pipes branched from the vapor pipe at a branch portion and connected to the first and second condensing portions respectively, and
   the switching valve is located at the branch portion.

5. The exhaust heat recovery system according to claim 4, wherein
   the piping includes first and second liquid pipes connected to the first and second condensing portions, respectively,
   the first and second liquid pipes are joined to a join pipe at a joint portion, and
   the join pipe is connected to the evaporation portion.

6. The exhaust heat recovery system according to claim 3, wherein
   the evaporation portion is located in an exhaust pipe of the engine to absorb heat from exhaust gas from the engine,
   the first condensing portion is located in an engine coolant circuit to heat the engine coolant, and
   the second condensing portion is located in an air conditioner to heat air in the air conditioner.

7. The exhaust heat recovery system according to claim 1, further comprising
   a control portion for controlling the operation of the switching valve based a temperature relative to a temperature of exhaust gas of the engine and an environmental condition.

* * * * *